Jan. 7, 1958   L. PERAS   2,818,613
FITTING OF PANES OF GLASS IN MOTOR VEHICLES
Filed Nov. 22, 1955   2 Sheets-Sheet 2

United States Patent Office 2,818,613
Patented Jan. 7, 1958

2,818,613

FITTING OF PANES OF GLASS IN MOTOR VEHICLES

Lucien Peras, Billancourt, France, assignor to Regie Nationale des Usines Renault, Billancourt, and Roger Petrignani, La Rochelle, France Application November 22, 1955, Serial No. 548,467

Claims priority, application France December 9, 1954

7 Claims. (Cl. 20—56.4)

The invention relates to the fitting of panes of glass in motor vehicles, and is chiefly applicable to the fitting of windscreen panes or windshields.

The search for safety for the passengers in a vehicle is a fundamental problem at the present time, and numerous accidents are still caused by panes of glass in the case of shocks received by the vehicle even when the windscreen panes or windshields fitted to the vehicle are of safety glass. The invention relates to a particular fitting, automatically detachable under the action of a shock, and allowing the pane of glass to be ejected outside its frame, and to fall outside without causing injury to the passengers.

The invention also relates to an improvement according to which the front part of the roof of the vehicle, situated directly above the windscreen, consists of a roof panel of Plexiglas or similar transparent material, and is also fitted in ejectable fashion.

The joint between the windscreen and this transparent partition is preferably effected by means of a rubber profile which is sufficiently flexible to allow one or the other of the two panes to be ejected under a shock coming from inside, this profile being capable of carrying attachment members allowing the fixing of accessories such as the driving mirror or a sun visor.

Figure 1:
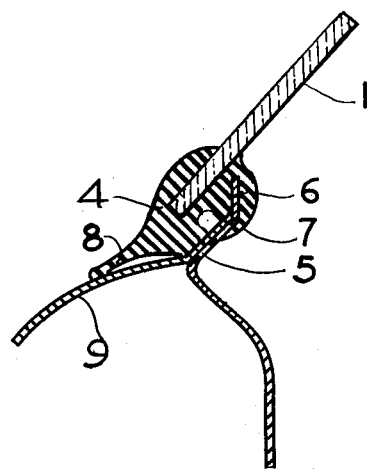
Fig. 1 represents a method of attachment in which the edge of the frame comprising a raised border portion, suitably shaped, engages like a lip in a slot extending over the whole periphery of the rubber beading surrounding the windscreen and making a joint against the receiving frame in the body.
Figure 2:
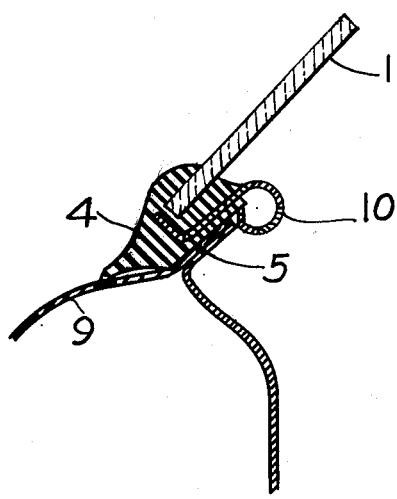
Fig. 2 shows a variant of the fitting in which a metal clip is buried, at the periphery of the opening, in the rubber beading surrounding the pane of glass, and engaging with the edge of the body frame.
Figure 3:
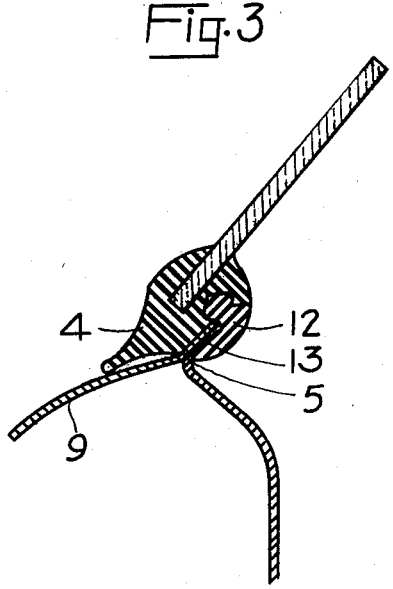
Fig. 3 is another embodiment in which a hard rubber key bears against the whole periphery of the glass frame, and engages in an orifice provided in the rubber beading.

If reference is made to the drawing, it will be seen that different methods of attaching the ejectable windscreen pane 1 are represented in Figs. 1, 2, 3. The windscreen, in the different cases considered, is buried at its edges in a rubber strip 4 which is attached to the metal body frame 5.

In the embodiment in Fig. 1, the edge 6 of the frame 5, which has an inclination equal to the bisector of the angle between the parallel and the perpendicular to the face of the pane of glass, is engaged in a slot 7 of the strip 4, the outside edge 8 of which, suitably hollowed out, bears against the scuttle 9.

In the embodiment of Fig. 2, the metal clip or hook 10, preferably of drawn metal, is buried in the strip 4, and hooks on the frame.

If reference is made to Fig. 3, it will be seen that the strip 4 is attached to the frame 5 by means of a rubber key 12, which is engaged over the whole periphery of the opening, in an orifice or recess of the same shape as the strip 4. This key 12 is preferably made of harder rubber than the strip 4. One face 13 of the key bears against the frame 5.

It must be clearly understood that in these three embodiments of attachment of the windscreen pane to the frame, any violent shock by the passengers against the windscreen will tend to free the attachment means, and allow the pane of glass to be ejected outwards.

Figure 4:
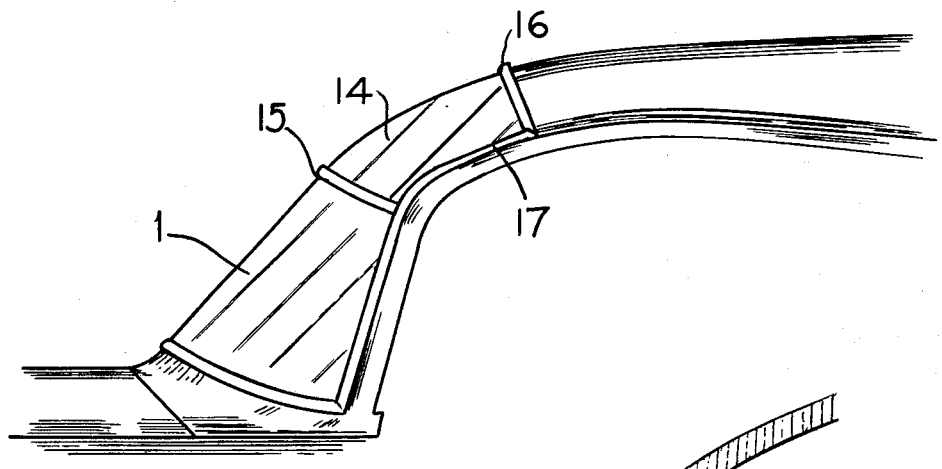
Fig. 4 is a profile view of a body element in which the front part of the roof consists of transparent material.
Figure 5:
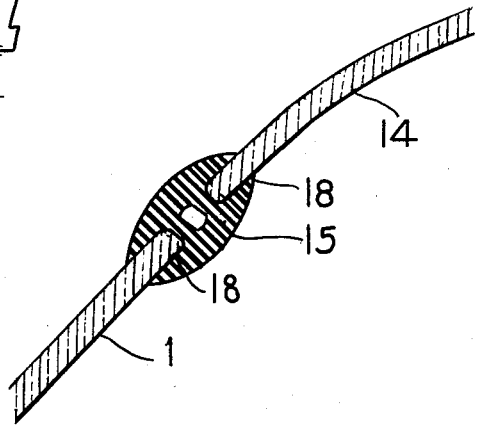
Fig. 5 is a detail view of the rubber joint between the windscreen and the part of the roof made of transparent material.
Figure 6:
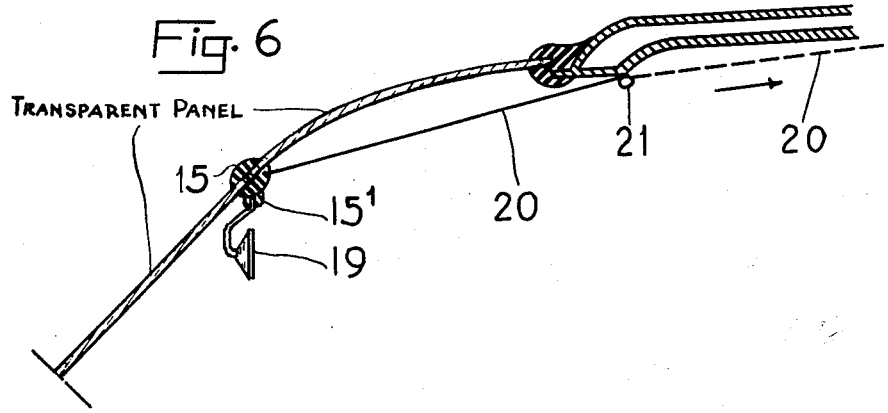
Fig. 6 is a longitudinal section showing the attachment of the transparent roof.

In the embodiment represented in Figs. 4, 5 and 6, a partition 14 of transparent material such as Plexiglas is arranged above the windscreen and over the whole width of an appreciable part of the width of the car, this partition being held in a detachable fashion so as to allow it to be ejected under the action of a shock coming from inside. Rubber strips 15, 16, 17 similar to those described in relation to the fitting of the windscreen, are provided for this purpose.

It will be noted that the strip 15 is applied directly between the windscreen 1 and the partition 14, the ends of which are accommodated in slots 18 provided on both sides of the strip 15 common to the windscreen and the roof. This strip consists of rubber which is sufficiently flexible to allow either of both panes to be ejected; it comprises moulded-in attachment members 15[1] for accessories such as the driving mirror 19, the sun visors, etc.

Finally, a sun visor 20 winding on a bar 21 can be provided, attached to any appropriate member provided on the strip 15.

I claim:

1. In a vehicle body construction having an opening for a transparent panel, a transparent panel in said opening, the body having a raised border portion extending at least about a part of the opening and defining a predetermined angle relative to the rest of the body, said predetermined angle substantially determining a plane in which said panel is disposed relative to the body, a resilient retaining strip disposed for resiliently and detachably holding said panel over the opening, said strip having a recess for receiving the panel and means for releasably engaging said border portion, said panel being larger than said opening and being disposed externally of said raised border portion, whereby said panel is removable only by a force having a predetermined value and being directed in an outward direction relative to said body.

2. A construction according to claim 1, in which the means for releasably engaging said border portion comprises a hooked spring metal clip imbedded and fixed in said resilient strip.

3. A construction according to claim 1, in which the means for releasably engaging said border portion comprises a hooked member having an extension releasably held by said resilient strip, the strip having a groove in which said hooked member is releasably held, the extension being disposed in a direction directed outwardly of the body and having a recess wherein said strip is engaged, whereby the panel is removable only by a force having a predetermined value and being directed in an outward direction relative to the body thereby disengaging the hooked member from the strip.

4. A construction according to claim 1, in which the opening is disposed in the forward part of the vehicle body and extends into the roof of the vehicle body comprising a windshield opening and a roof opening, said first mentioned panel comprising a windshield, a second transparent panel comprising a roof panel disposed adjacent said windshield and over the roof opening, said retaining strip being disposed for resiliently and detachably holding said second panel over the roof opening, said second panel being greater than the roof opening, another resilient strip member, said other strip being disposed between the windshield and the roof panel and having recesses for receiving an edge portion of the windshield and an edge portion of the roof panel in substantially the same plane, whereby each of said panels are removable only by a force having a predetermined value and being directed in an outward direction relative to the body.

5. A construction according to claim 4, in which said other strip includes means for attaching accessories thereto.

6. In a vehicle body construction having an opening for a transparent panel, a transparent panel in said opening, the body having a raised border portion extending at least about a part of the opening and defining a predetermined angle relative to the rest of the body and having an edge portion deflected outwardly of the body and bordering the opening to an extent corresponding to said border portion, said predetermined angle substantially determining a plane in which said panel is disposed relative to the body, a resilient retaining strip disposed for resiliently and detachably holding said panel over the opening, said strip having a recess for receiving the panel and a recess for receiving said outwardly deflected edge portion, the panel being larger than said opening and being disposed externally of said edge portion, whereby said panel is removable only by a force having a predetermined value and being directed in an outward direction relative to said body.

7. In a vehicle body construction according to claim 6, in which said opening is disposed in the forward part of the vehicle body comprising a windshield opening and in which said panel comprises a windshield.

References Cited in the file of this patent

UNITED STATES PATENTS

| 2,255,725 | Trescher | Sept. 9, 1941 |
| 2,261,038 | Sherts | Oct. 28, 1941 |
| 2,623,250 | Chilton | Dec. 30, 1952 |
| 2,641,031 | Ehret | June 9, 1953 |
| 2,679,075 | Bradley | May 25, 1954 |

FOREIGN PATENTS

| 1,043,364 | France | June 10, 1953 |